United States Patent [19]

Akkawi et al.

[11] Patent Number: 5,471,589
[45] Date of Patent: Nov. 28, 1995

[54] MULTIPROCESSOR DATA PROCESSING SYSTEM HAVING NONSYMMETRICAL CHANNEL(X) TO CHANNEL(Y) INTERCONNECTIONS

[75] Inventors: Isam W. Akkawi, Aptos; Scott H. Hayashida, San Diego; Vivek Ladha, Santa Clara; John E. Rudy, Poway, all of Calif.

[73] Assignee: Unisys Corporation, Blue Bell, Pa.

[21] Appl. No.: 118,164

[22] Filed: Sep. 8, 1993

[51] Int. Cl.$^6$ ................................................. G06F 13/00
[52] U.S. Cl. ................ 395/800; 395/200.01; 395/280; 370/95.1
[58] Field of Search ....................... 395/200, 325; 370/60, 94; 341/159

[56] References Cited

U.S. PATENT DOCUMENTS

| | | | |
|---|---|---|---|
| 4,814,980 | 3/1989 | Peterson et al. | 364/200 |
| 4,933,933 | 6/1990 | Dally et al. | 370/60 |
| 5,008,882 | 4/1991 | Peterson et al. | 370/94 |
| 5,170,393 | 12/1992 | Peterson et al. | 370/60 |
| 5,170,482 | 12/1992 | Shu et al. | 395/800 |
| 5,175,733 | 12/1992 | Nugent | 370/60 |
| 5,181,017 | 1/1993 | Frey, Jr. et al. | 395/200 |
| 5,194,867 | 3/1993 | Fisher | 341/159 |
| 5,347,450 | 9/1994 | Nugent | 395/200 |
| 5,353,283 | 10/1994 | Tsuchiya | 370/60 |

Primary Examiner—Jack B. Harvey
Assistant Examiner—David A. Wiley
Attorney, Agent, or Firm—Charles J. Fassbender; Mark T. Starr; Robert R. Axenfeld

[57] ABSTRACT

A multiprocessor data processing system comprises a plurality of unsymmetrically connected data processing nodes; where the total number of nodes is more than $2^{n-1}$ and less than $2^n$, and n is an integer larger than two Each node has n input/output channels which respectively are channel(0), channel(1), channel(2), etc.; each node has a binary address $b_{n-1} \ldots b_1 b_0$ which runs consecutively from node to node; each pair of nodes whose binary addresses differ by only one binary bit $b_x$ are interconnected by a channel(x) to channel(x) connection; and, at least one pair of nodes whose binary addresses differ by two binary bits $b_x$ and $b_y$ are interconnected by a channel(x) to channel(y) connection, where x and y=0,1, ... n–1. To establish a route from any one node to any other node, channels are selected which decrease the distance to the destination by two nodes or one node or maintain the same distance.

13 Claims, 6 Drawing Sheets

MULTIPROCESSOR DATA PROCESSING SYSTEM HAVING NONSYMMETRICAL CHANNEL(X) TO CHANNEL(Y) INTERCONNECTIONS

BACKGROUND OF THE INVENTION

This invention relates to the architecture of multiprocessor data processing systems; and more particularly, it relates to circuits which establish a route from any one data processing node to any other node in such a system.

By a multiprocessor data processing system is herein meant an array of data processing nodes which are interconnected to each other by multiple input/output channels. In this array, each data processing node has an address, and each data processing node can send a message over the input/output channels to any other data processing node. A node which initiates a message is called the source node; and a node which is to ultimately receive the message is called the destination node.

If the source node and the destination node are not connected directly to each other by their input/output channels, then that message must somehow be routed through other nodes in the data processing system which are called intermediate nodes. For example, the message might be routed in a serial fashion from a source node through four or five different intermediate nodes before it reaches the destination node.

In the prior art, multiprocessor data processing systems of the above type, as well as circuits for establishing a route between any two nodes of the system, are described in U.S. Pat. No. 4,814,980 entitled "Concurrent Hypercube System With Improved Message Passing", and U.S. Pat. No. 5,008,882 entitled "Method and Apparatus for Eliminating Unsuccessful Tries In A Search Tree". Also in the prior art are two technical papers by some of the co-inventors of the above patents; and these technical papers are: "Hyperswitch Network For the Hypercube Computer" by E. Chow, H. Madas, J. Peterson, D. Grunwald, and D. Reed, 15th Annual International Symposium On Computer Architecture, May 30–Jun. 2, 1988; and, "A High-Speed Message Driven Communication Architecture" by J. Peterson, E. Chow, and H. Madas, proceedings of the 1988 ACM International Conference on Super-computing, Saint-Malo France, Jul. 4–8, 1988.

In all of the data processing systems which the above patents and papers describe, the total number of data processing nodes is N which is a power of two ($N=2^n$); and this constraint enables the nodes to be interconnected and operate as a symmetrical array which is called a hypercube. Specifically, in the hypercube, 1) each of the N nodes has "n" input/output channels which are channel(0), channel(1), channel(2), etc.; 2) each and every pair of nodes which are connected together have binary addresses that differ by just one bit $b_x$; 3) each connected pair of nodes are connected with a channel(x) to channel(x) connection; and 4) a channel is selected to route a message to a destination node only if that channel decreases the distance to the destination by exactly one node.

However, a serious practical drawback with the hypercube system in that the number of nodes which the hypercube must have is too limited. For example, suppose a customer with a 128 node hypercube system ($N=2^7$) wants to expand his system. To do that, the number of nodes must be increased to $2^8$ or 256; so another 128 nodes must be added to the existing system! This large increase in the total number of nodes will double the cost of network and be completely impractical for a customer who only wants to add just a few more nodes to his existing system. But, in the above cited patents and papers, the array must have $2^n$ nodes; and, with the message routing circuits which are disclosed, a multiprocessor system having other than $2^n$ nodes will not work.

BRIEF SUMMARY OF THE INVENTION

A multiprocessor data processing system, which is structured in accordance with the present invention, comprises a plurality of unsymmetrically connected data processing nodes; where the total number of nodes is more than $2^{n-1}$ and less than $2^n$, and n is an integer larger than two. Each node has n input/output channels which respectively are channel(0), channel(1), channel(2), etc.; each node has a binary address $b_{n-1} \ldots b_1 b_0$ which runs consecutively from node to node; each pair of nodes whose binary addresses differ by only one binary bit $b_x$ are interconnected by a channel(x) to channel(x) connection; and, at least one pair of nodes whose binary addresses differ by two binary bits $b_x$ and $b_y$ are interconnected by a channel(x) to channel(y) connection, where x and $y=0,1,\ldots n-1$.

In order to establish a route from any one node to any other node in the disclosed data processing system, channels are selected which decrease the distance to the destination by two nodes or one node or maintain the same distance. To achieve the above, each node includes an input register which receives, from one of its channels, a header with a destination field and a distance field; and each node also includes a transmitter which sends a modified header on another selectable different one of its channels. This modified header is generated by a conditional subtracter circuit which subtracts two from the distance field if the selected channel forms a channel(x) to channel(y) connection to another node, and otherwise subtracts one from the distance field.

By virtue of the channel(x) to channel(y) connections, the nodes of the disclosed system are connected unsymmetrically; and at the same time, no node is isolated by a relatively small number of channels from the other nodes. Preferably, the sum of the channel(x) to channel(x) connections plus the channel(x) to channel(y) connections from any particular node is within one of the sum of such connections from any other node; and this limitation may be met by a node having multiple channel(x) to channel(y) connections to several other nodes.

Also, in the disclosed data processing system, some nodes have some unconnected channels. Preferably, only nodes whose most significant address bit $b_{n-1}$ is a "0", have an unconnected channel; and, only the highest numbered channel of any node is unconnected.

BRIEF DESCRIPTION OF THE DRAWINGS

Various preferred embodiments of the invention are described herein in conjunction with the accompanying drawings wherein.

DETAILED DESCRIPTION

Figure 1:
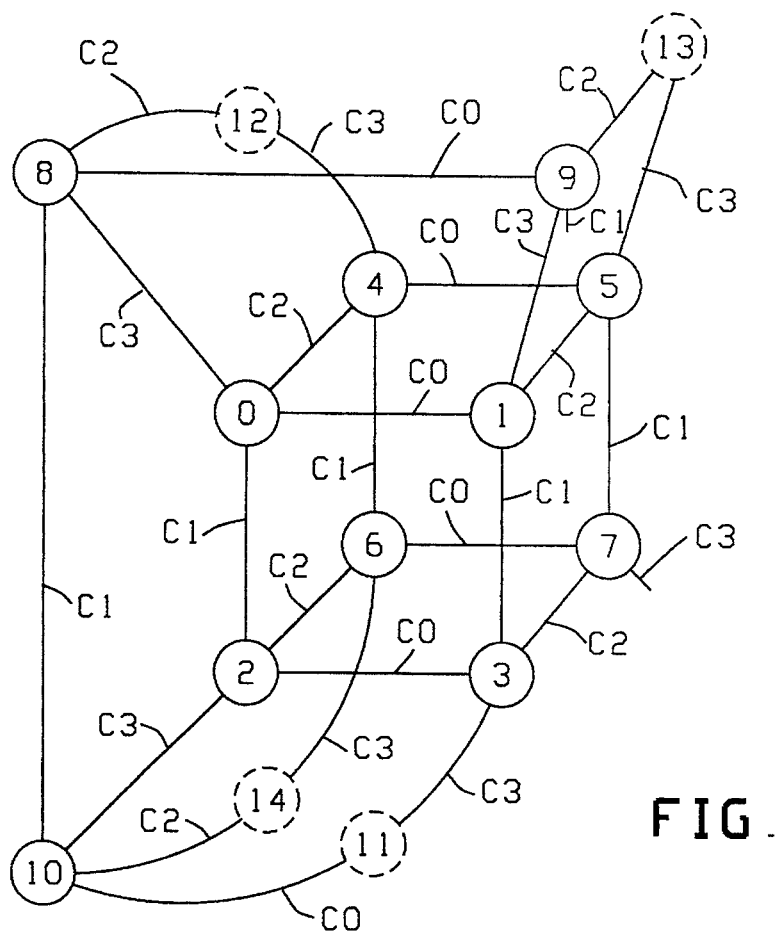
FIG. 1 shows an eleven node data processing system which is structured in accordance with the present invention.

Referring now to FIG. 1, it shows a multiprocessor data processing system which is structured as one preferred embodiment of the present invention. In the FIG. 1 system, there are a total of eleven data processing nodes which are schematically shown as eleven circles that are consecutively numbered 0, 1, 2, . . . . 10; and, each particular node has a corresponding four bit binary address. For example, node 5 has a four bit binary address $b_3b_2b_1b_0$ of 0101; node 8 has a four bit binary address $b_3b_2b_1b_0$ of 1000; etc.

Each node in the FIG. 1 system also has four full duplex input/output channels. In FIG. 1, channel(0) is labeled C0; channel(1) is labeled C1; channel(2) is labeled C2; and channel(3) is labeled C3. If a pair of nodes have binary addresses which differ by only one binary bit $b_x$, then the nodes of that pair are interconnected by a channel(x) to channel(x) connection. For example, node 3 and node 7 have binary addresses of 0011 and 0111 which differ by one binary bit $b_2$; and thus, the nodes 3 and 7 are interconnected by a channel(2) to channel(2) connection. Likewise, nodes 8 and 10 have binary addresses of 1000 and 1010 which differ by one binary bit $b_1$; and thus the nodes 8 and 10 are interconnected by a channel(1) to channel(1) connection.

Further in the FIG. 1 system, there are four pairs of nodes whose binary addresses differ by two binary bits $b_x$ and $b_y$ which are interconnected by a channel(x) to channel(y) connection. These four pairs of nodes are nodes 10 and 3, nodes 9 and 5, nodes 8 and 4, and nodes 6 and 10. Node 10, for example, has a binary address of 1010 whereas node 3 has a binary address of 0011; these addresses differ by the two binary bits of $b_3$ and $b_0$, and thus the nodes 10 and 3 are interconnected by a channel(3) to channel(0) connection. Likewise, node 9 has a binary address of 1001 whereas node 5 has a binary address of 0101; these addresses differ by bits $b_3$ and $b_2$, and thus the nodes 9 and 5 are interconnected by a channel(3) to channel(2) connection.

During the operation of the FIG. 1 data processing system, messages are passed along the channels from any one node to any other node. A node which originates the message is herein called the source node; a node which ultimately receives the message is called the destination node; and any node through which the message passes while traveling from the source to the destination is called an intermediate node. For example, a message could start at a source node 10 and be sent to a destination node 5 through intermediate nodes 2, 3, and 1.

In order to establish the route by which a particular message passes from a source node to a destination node, that message is preceded by a header. When a node has a header to send, it may try several different routes to reach the destination. For example, a header from node 10 to node 5 may leave node 10 on channel(0) and pass through the intermediate nodes of 3 and 7; or that same header may leave node 10 through channel(2) and pass through the intermediate nodes of 6 and 4; etc.

Figure 2:
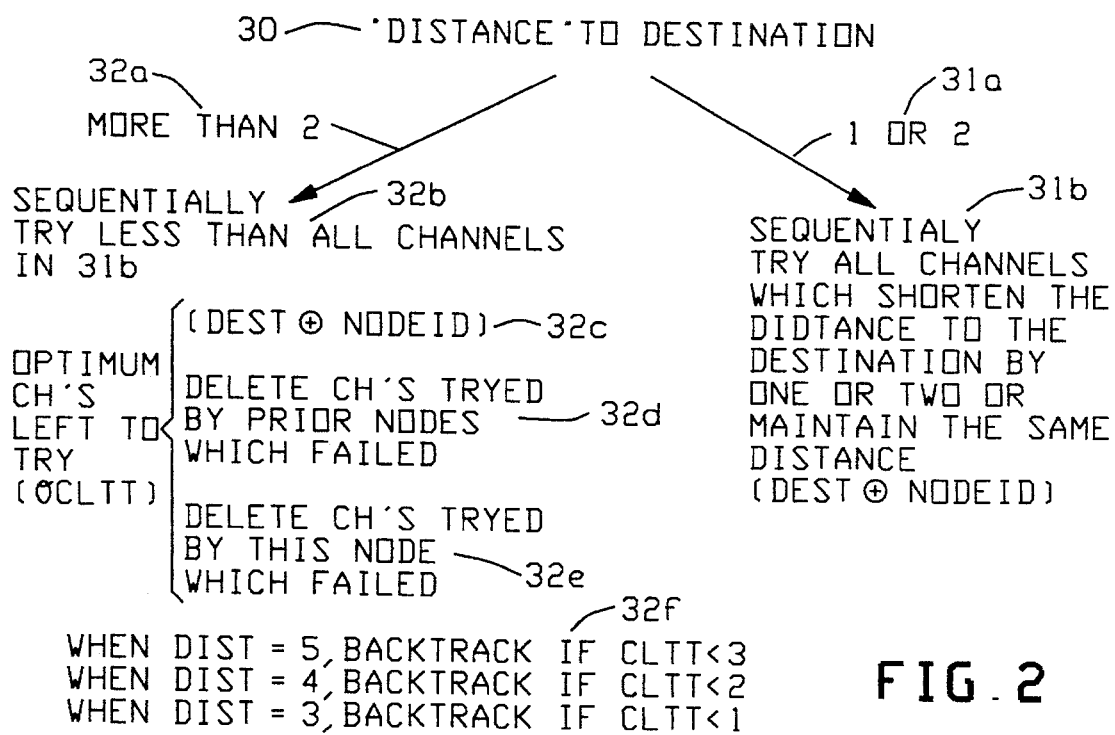
FIG. 2 is a flow diagram which shows a process by which a route is established from any one node to any other node in the FIG. 1 system.

In order to now explain the details by which a header passes from one node to another node in the FIG. 1 system, a flow chart in FIG. 2 is provided. Initially, as is indicated by line 30 of FIG. 2, a node which has a header to send (i.e.—a source node or an intermediate node) checks the "distance" to the destination. This distance is the minimum number of times that the header must be sent from one node to another via the channel(x) to channel(x) connections in order to reach the destination. For example, a header at node 10 which has a destination of node 7 is at a distance of three from node 7.

If the distance to the destination is one or two, then all channels which either shorten the distance to the destination by one or two, or channels which maintain the same distance, will be tried. This is indicated by lines 31a and 31b of FIG. 2; and, it stops when the destination is reached or when all such channels have been tried one time. Conversely, if the distance to the destination is more than two, then less than all of the channels which shorten that distance by one or two, or maintain the same distance, will be tried; and this is indicated by lines 32a and 32b of FIG. 2.

In order to determine which channels either shorten the distance by one or two or maintain the same distance, the binary address of the node which presently has the header is EXCLUSIVELY-OR'd with the binary address of the destination node. Then, each "1" bit in the result of that EXCLUSIVE-OR corresponds to a channel which meets the above criteria. For example, suppose that node 2 has a header whose destination is node 7. In that case, the EXCLUSIVE-OR of the binary address 2 and the binary address 7 is 0010⊕0111=0101. Since the "1" bits in this result are bits $b_0$ and $b_2$, the channels from node 2 which shorten the distance to the destination by one or two or maintain the same distance are channel(0) and channel(2). Likewise, if node 8 has a header whose destination is node 4, the EXCLUSIVE-OR of the binary addresses of 8 and 4 is 1000⊕0100=1100; and the resulting "1" in the bit positions $b_3$ and $b_2$ indicate that channel 3 and channel 2 will shorten by one or two or maintain the same distance to the destination.

When the distance to the destination is more than two, then the above described EXCLUSIVE-OR operation is just the first step of determining which channels are to be tried; and this first step is indicated as step 32c of FIG. 2. From the EXCLUSIVE-OR result, all channels are deleted which have been tried by prior nodes that received the header but through which the header failed to reach the destination; and this indicated by step 32d of FIG. 2. Likewise, all channels are deleted which the node that presently holds the header has already tried but through which the header failed to reach the destination; and this is indicated by step 32e of FIG. 2.

Figure 3:
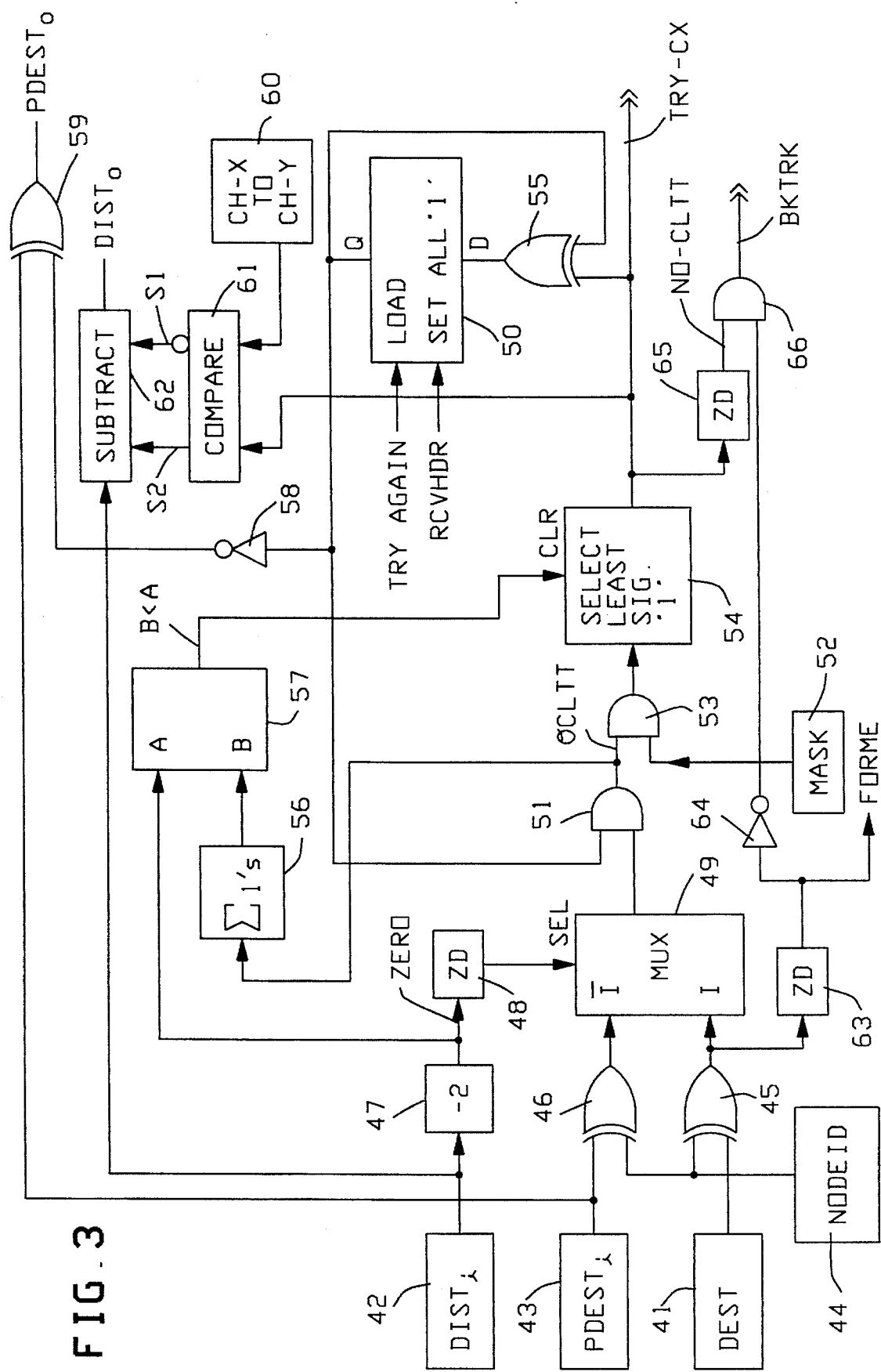
FIG. 3 is a circuit diagram of a header routing circuit which is in each node of the FIG. 1 system and which establishes a route through the node by performing the FIG. 2 process.
Figure 5:
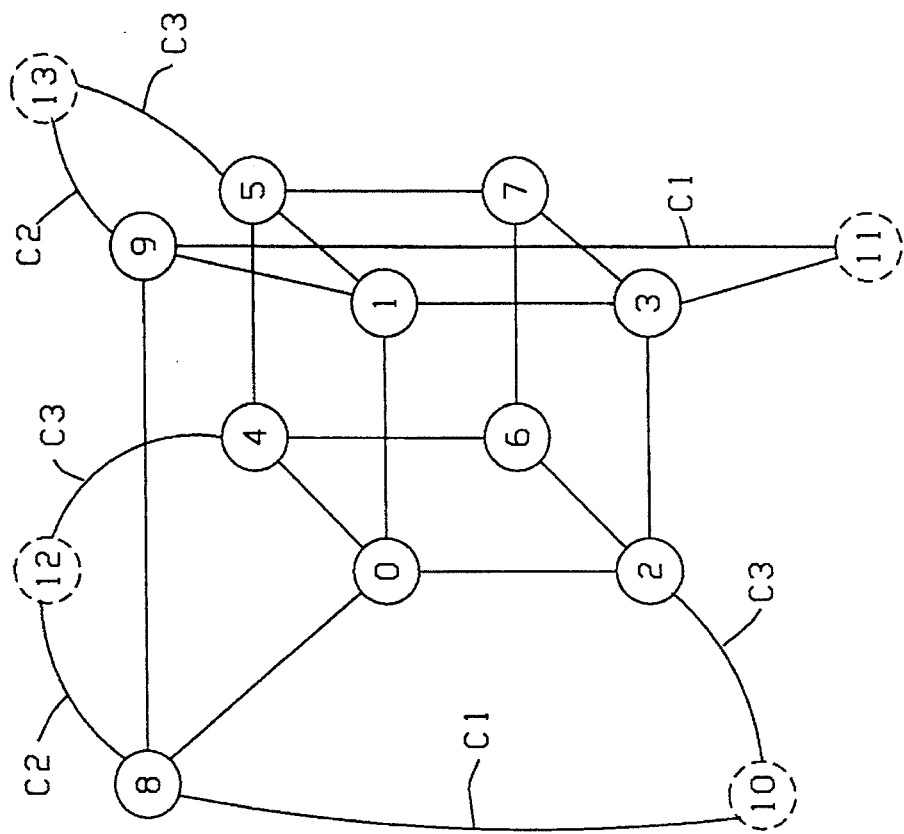
FIG. 5 shows a ten node data processing system which is structured in accordance with the present invention.

Those channels which are left after the process steps of 32c, 32d, 32e are performed, are herein called the optimum channels left to try (OCLTT). If at the particular node which holds the header, the optimum channels which are left to try is less than the distance to the destination minus two, then all further attempts to reach the destination from that node are aborted; and the header is sent back to the prior node from which it was received. This is indicated by step 32f of FIG. 2. Conversely, if at the particular node which holds the header the optimum channels left to try are more than or equal to the distance to the destination minus two, then another attempt will be made to reach the destination through one of those channels. A preferred circuit which routes the header from node to node in the FIG. 1 system in accordance with the FIG. 2 process is shown in FIG. 3. This FIG. 3 control circuit is replicated four times in each of nodes 0 thru 10. In other words, within each node of the FIG. 1 system, each of the four input/output channels C0 thru C3 has its own FIG. 1 control circuit.

Included in the FIG. 3 control circuit are several components 41–66; and, each of these components is identified in Table 1 below.

TABLE 1

| ITEM | DESCRIPTION |
|---|---|
| 41 | a register which holds the binary address of a destination field in the header. |
| 42 | a register which holds a distance field in the header. |
| 43 | a register which holds a "pseudo" destination field in the header. |
| 44 | a register which holds the binary address of the node in which the FIG. 3 circuit resides. |
| 45 | a set of EXCLUSIVE-OR gates that EXCLUSIVE-OR bits of like power in the registers 41 and 44. |
| 46 | a set of EXCLUSIVE-OR gates that EXCLUSIVE-OR bits of like power in the registers 43 and 44. |
| 47 | a subtracter circuit which subtracts two from the distance field in register 42, unless the result would be negative in which case the subtracter circuit sets the result to zero. |
| 48 | a zero detect circuit which generates a digital logic output signal ZERO in a true state when the result from the subtracter circuit 47 is zero. |
| 49 | a 2 × 1 multiplexor which passes the bits on an input I to its output when the signal ZERO on the select terminal SEL is true, and which otherwise passes the bits on an input $\bar{I}$ to its output. |
| 50 | a control register having data inputs D and data outputs Q. The data inputs are written into this register when a control signal TRY AGAIN is true; and all "1's" are written into this register when a control signal RCVHDR is true. |
| 51 | a set of AND gates which AND bits of like power from register 50 and multiplexor 49. |
| 52 | a mask register which stores a "0" as its k-th bit $b_k$ if channel(k) is not connected, and stores a "1" as it's k-th bit if channel(k) is connected (where k=0,1,2,3). |
| 53 | a set of AND gates which AND bits of like power from register 52 and the AND gates 51. |
| 54 | a circuit which receives the bits from the set of AND gates 53; and as an output, passes just the least significant "1" bit that it receives while forcing all other outputs to "0" (e.g. - with an input of 1010,the output is 0010). This circuit also has a clear input "CLR" which overrides the above operation and forces all of the output bits to "0" when the "CLR" input is true. |
| 55 | a set of EXCLUSIVE-OR gates which EXCLUSIVE-OR bits of like power from circuit 54 and register 50. |
| 56 | an adder circuit which adds all of the "1" bits from the set of AND gates 51. |
| 57 | a comparator circuit which receives as an input "A" one binary number from the subtracter circuit 47, receives as an input "B" another binary number from the adder circuit 56, and generates |

TABLE 1-continued

| ITEM | DESCRIPTION |
|---|---|
| | a digital logic signal B<A in a true state when input "B" is less than input "A". |
| 58 | a set of inverters which invert the output signals from register 50. |
| 59 | a set of EXCLUSIVE-OR gates which EXCLUSIVE-OR bits of like power from the inverters 58 and the register 43. |
| 60 | a register which stores a "1" in its x-th bit $b_x$ if channel(x) from the node in which the FIG. 3 circuit resides forms a channel(x) to channel(y) connection to another node, and otherwise stores a "0" ; where x=0, 1, 2, 3. |
| 61 | a comparator circuit which receives the output signals from register 60 and circuit 54, and which - a) generates a subtract by two control signal "S2" in a true state if the single "1" bit from circuit 54 is matched with a "1" bit of like power from register 60 (e.g. - 0100 from circuit 54 is matched with X1XX from register 60); and b) otherwise generates a subtract by one signal "S1" in a true state. |
| 62 | a conditional subtracter circuit which generates an output by subtracting two from its input if signal S2 is true, and by subtracting one from its input if signal S1 is true. However, if the result of the above subtraction would be negative, then the output is forced to all zero. |
| 63 | a zero detect circuit which generates a digital logic signal "FOR ME" in a true state when all of the signals from the set of EXCLUSIVE-OR gates 45 are a "0". This indicates the header has reached its destination. |
| 64 | an inverter which inverts the "FOR ME" signal. |
| 65 | a zero detect circuit which generates a digital logic signal No Channels Left To Try "NO-CLTT" in a true state when all of the bits from circuit 54 are a "0". |
| 66 | an AND gate which generates a digital logic signal BACKTRACK "BKTRK" in a true state when signal NO-CLTT is true and signal FOR-ME is false. |

How all of the above components 41–66 interact with one another to perform the header routing process of FIG. 2 will now be described. Initially, when the source node generates a header or an intermediate node receives the header from another node, the fields of that header are stored in the registers 41, 42, and 43. Register 41 stores the destination field of the header which specifies the binary address of the destination node; register 42 stores the distance field of the header which specifies the distance from the present node to the destination; and register 43 stores a "pseudo destination" field in the header which at the source node, is initially set equal to the destination field. Subsequently, as attempts to reach the destination node are made, the pseudo destination field gets modified as will be explained shortly.

If the distance to the destination is one or two, then the signal ZERO, which is generated by the FIG. 3 components 47 and 48, will be true; and in response, the input I signals to the multiplexor 49 will pass to the multiplexor's output. This operation is in accordance with the steps 31a and 31b of FIG. 2. Input I receives the EXCLUSIVE-OR of the binary address of the destination node as stored in register 41 and the binary address of the node which presently holds the header as stored in register 44; and the result of that EXCLUSIVE-OR has a "1" in bit $b_x$ if the corresponding channel(x) is one of the channels which shortens the distance to the distinction by one or two, or maintains the same distance to the destination.

Conversely, if the distance to the destination as indicated by register 42 is more than two, then the signal ZERO to the multiplexor 49 will be false; and as a result, the multiplexor 49 will pass the signals on its input $\bar{I}$ to its output. This operation is in accordance with steps 32a and 32b of FIG. 2. Input $\bar{I}$ receives the EXCLUSIVE-OR of the pseudo destination field in register 43 and the binary address of the node which presently holds the header as stored in register 44.

Those signals which occur on the output of multiplexor 49 are processed by the FIG. 3 components 50–55 to sequentially select the channels on which the header is to be sent in an attempt to reach the destination. When a header is initially received by an intermediate node or initially generated by a source node, the register 50 is set to all 1's. This occurs in response to the RCVHDR signal going true. These 1's from register 50 go to the AND gates 51; and consequently, all of the signals from the multiplexor 49 initially pass through those AND gates.

If all of the channels from the present node are connected to other nodes, then all of the signals from the AND gates 51 will also pass through the AND gates 53. This is because the mask register 52, which forms the second input to the AND gates 53, stores a one in each bit position $b_x$ where the corresponding channel(x) is connected to another node. Conversely, if any channels from the present node are not connected, then the bits which correspond to those channels in the mask register 52 will be "0".

All of the output signals from the AND gates 53 are sent to circuit 54; and that circuit passes on its output only the least significant "1" bit which it receives. For example, if the input to the circuit 54 is a 1010 (which indicates that the channel(3) and channel(1) will either shorten the distance by one or two, or maintain the same distance, to the destination), then the output from circuit 54 will be 0010 (which indicates that channel(1) was selected). In other words, from circuit 54, the TRY-CX signals will be as follows: TRY-C0=0, TRY-C1=1, TRY-C2=0, and TRY-C3=0.

In response to the true state of one of the signals TRY-CX (where X=0, 1, 2, 3) the node which presently holds the header will attempt to send the header on that nodes channel(x). However, before the header is actually sent out on channel(x), some modifications are made to the distance field and the pseudo destination field. In FIG. 3, the modifications to the distance field are made by components 60, 61, and 62; and the modifications which are made to the pseudo destination field are made by components 58 and 59.

Consider first the modifications that are made to the distance field 42. If the channel on which the header is to be sent forms a channel(x) to channel(x) connection, then the distance field which is sent is set to the distance field as stored in register 42 minus one; but if the channel on which the header is to be sent forms a channel(x) to channel(y) connection, then the distance field which is sent is set to the distance field as stored in register 42 minus two. However, in each of the above cases, if the result of the subtraction would generate a negative number, then the distance field which is sent out is forced to zero.

When the above subtraction is minus one, then the distance to the destination node is kept accurate as the header travels to the next node. However, if the above subtraction is minus two, then the distance to the destination will be accurate or be too small by two when the header reaches the next node. In the event that the sending of the header over a channel(x) to channel(y) connection actually places the header two nodes closer to the destination, then the above subtraction of minus two will keep the distance to the destination accurate. However, in the event that the sending of the header over a channel(x) to channel(y) connection maintains the same distance to the destination, then the above subtraction of minus two makes the distance field smaller than the actual distance to the destination by two.

But the effect of having the "distance" in step 30 of FIG. 2 be smaller than the actual distance is that the FIG. 2 process will switch from step 32a to step 31a sooner than it otherwise would. Such a shift simply means that some extra or non-optimal channels to the destination may be tried; and this occasional making of extra tries to reach the destination will only help the success rate of actually reaching the destination. By comparison, if the "distance" in step 30 of FIG. 2 were somehow made larger than the actual distance to the destination, then the backtracking in step 32f would occur prematurely. That is, certain optimum channels that should be tried would be ignored; and that would cause the success rate in reaching the destination to drop.

Next, consider the manner in which the pseudo destination field is modified by the FIG. 3 components 58 and 59. In FIG. 3, the inverters 58 receive as their input the signals from register 50; and as was explained above, that register 50 is initially set to all 1's. However, each time an unsuccessful attempt is made to send a header to the destination node over a particular channel(x), then bit x of register 50 is reset to "0". This resetting occurs due to the operation of the EXCLUSIVE-OR gates 55 and the TRY AGAIN signal which causes the output of the EXCLUSIVE-OR gates 55 to be loaded into the register 50.

Suppose, for example, that the present node attempts to send the header to the destination from channel(0), and the attempt is unsuccessful. In that case, bit zero of register 50 will get reset to "0". Thereafter, if the present node attempts to send the header to the destination from channel(2) of the present node and that attempt is unsuccessful, then bit two of register 50 will get reset to "0".

From the above description it follows that the output of the inverters 58 will initially be all "0". Later however, some of the output signals from the inverters 58 will become a "1"; and each such "1" indicates a particular channel on which the header was sent but was unsuccessful in reaching the destination. Those "1" bits from the inverters 58 are sent to the EXCLUSIVE-OR gates 59 where they operate to invert corresponding bits of the pseudo destination field from the register 43. In other words, the modified pseudo destination field which is sent in a header to the next node is the pseudo destination field as stored in register 43, except that bits are inverted if they correspond to channels that were unsuccessfully tried.

For example, suppose that the destination field in register 43 is a 1010 and that attempts were made on channel(0) and channel(1) to reach that destination. In that case, the modified pseudo destination from the EXCLUSIVE-OR gates 59 would be 1010⊕0011 or 1001. In effect, what this modification of the pseudo destination field is accomplishing is preventing the next node to which the header is sent from retrying any of the channels which previously were tried but failed. This is in accordance with step 32d of FIG. 2.

How the above inverting of a bit $b_x$ in the pseudo destination field prevents a node from retrying channel(x) can be understood as follows. The operation of [Destination ⊕ Node ID] yields a result R that has a "1" in each bit position which corresponds to a channel that will shorten the distance by one or two, or maintain the same distance, to the destination. If it is desired to delete channel(0) from the result R, then that is achieved by the operation R⊕0001. Likewise, if it is desired to delete channel(1) from the result R, then that is achieved by the operation R⊕0010; etc. Now, the operation [Destination ⊕ Node ID ⊕ 0001] produces the same end result regardless of what order the two EXCLUSIVE-OR operations are performed. Thus, by sending [Destination ⊕ 0001] to the next node as a pseudo destination, channel(0) will be eliminated when that next node EXCLUSIVE-OR's its node ID with the pseudo destination.

Consider now how the above described register 50 interacts with the components 51, 52, 53, and 54. If register 50 indicates that a header as sent on a particular channel(x) was unsuccessful in reaching its destination, then that channel(x) is prevented from being retried due to the AND gates 51. For example, if the output signals from the multiplexor 49 are 1101 (which identify channel(3), channel(2), and channel(0); and the output signals from register 50 are 1110, (which indicates that channel(0) has already been unsuccessfully tried), then the output signals from the AND gates 51 will be 1100 (which identify channel(2) and channel(3). Then, circuit 54 will select the least significant "1" which corresponds to selecting channel(2) as the next channel to try. If the attempt to reach the destination from channel(2) is unsuccessful, then bit two of register 50 will be reset to "0"; and as a result, the only "1" bit from multiplexor 49 which passes through the AND gates 51, will be bit 3 (which corresponds to channel(3)). All of this is in accordance with the FIG. 2 steps of 31b and 32e.

Now if all of the output signals from circuit 54 are "0", then that means that there are no channels left to try. This condition is detected in the FIG. 3 circuit by the zero detector 65. When there are no channels left to try and the address of the destination does not equal the address of the present node, then a signal BKTRK is generated by the AND gate 66. This signal BKTRK indicates that the attempted route from the source node to the destination node is blocked, and thus the route should be backtracked. Consequently, the BKTRK signal is sent back to the preceding node from which the header was received. In that preceding node, the BKTRK signal causes the above described TRY AGAIN signal on register 50 to go true; and thus in that node, the entire channel selection process as described above is repeated.

Note that, the TRY AGAIN signal will also be generated internally within a node if that node is busy using the channel that was selected by circuit 54. This will occur for example, if a node has established a route through itself from its channel(0) to its channel(2), and a header is received on channel(3) which the FIG. 3 circuit for channel(3) attempts to route through channel(2).

Lastly in the FIG. 3 circuit, the components 56 and 57 carry out the FIG. 2 process step of 32f. That is, the functions of those components 56 and 57 is to cause the BKTRK signal to be generated before all channels which shorten the distance by one or two, or maintain the distance, to the destination from a particular node have been tried. Component 57 is a comparator with two inputs A and B. Input A receives the distance minus two to the destination; whereas input B receives a sum which is the number of channels that are left to try. In other words, input B to the comparator 57 is the result of performing the process steps of 32c, 32d, and 32e in FIG. 2. If the B input of the comparator 57 is less than the A input, then the B<A signal from the comparator is true; that forces all of the output signals from circuit 54 to "0"; and, that causes the BKTRK signal from the AND gate 66 to be generated.

An important feature of the FIG. 1 data processing system is that the channel(x) to channel(y) connections prevent any of the nodes 0 thru 10 from being isolated. For example, if the channel(x) to channel(y) connections are eliminated, then there remains only three channels from node 8, and only two channels from nodes 9 and 10. In order to increase the number of channels to the nodes 8, 9, and 10 while having only channel(x) to channel(x) connections, then additional nodes would have to be added. These additional nodes are shown schematically in FIG. 1 as circles drawn with dashed lines; and their binary addresses would be 11, 12, 13, and 14 as shown. However, as the nodes 11, 12, 13, and 14 are added, they themselves become isolated nodes. In particular, each of the nodes 11, 12, 13, and 14 have only two channel(x) to channel(x) connections.

One preferred embodiment of the invention has now been described in detail. In addition however, many changes and modification can be made to this embodiment without departing from the nature and spirit of the invention.

In particular, in the FIG. 1 data processing system there are a total of eleven data processing nodes; however, the present invention covers all similar systems in which the total number of nodes is more than $2^{n-1}$ but less than $2^n$, where n is an integer larger than two. Thus, the present invention covers a data processing system where the total number of nodes are more than four but less than eight, more than eight but less than sixteen, more than sixteen but less than thirty-two, etc. Examples of such systems are shown in FIG'S. 4–11.

In the above data processing systems, each node has n input/output channels which are channel(0), channel(1), channel(2), etc.; and each node has a binary address $b_{n-1} \ldots b_1 b_0$ which runs consecutively from node to node. Also, each pair of nodes whose binary addresses differ by only one binary bit $b_x$ is interconnected by a channel(x) to channel(x) connection; and, at least one pair of nodes whose binary addresses differ by two binary bits $b_x$ and $b_y$ are interconnected by a channel(x) to channel(y) connection, where x and y=0,1, . . . n–1.

Figure 4:
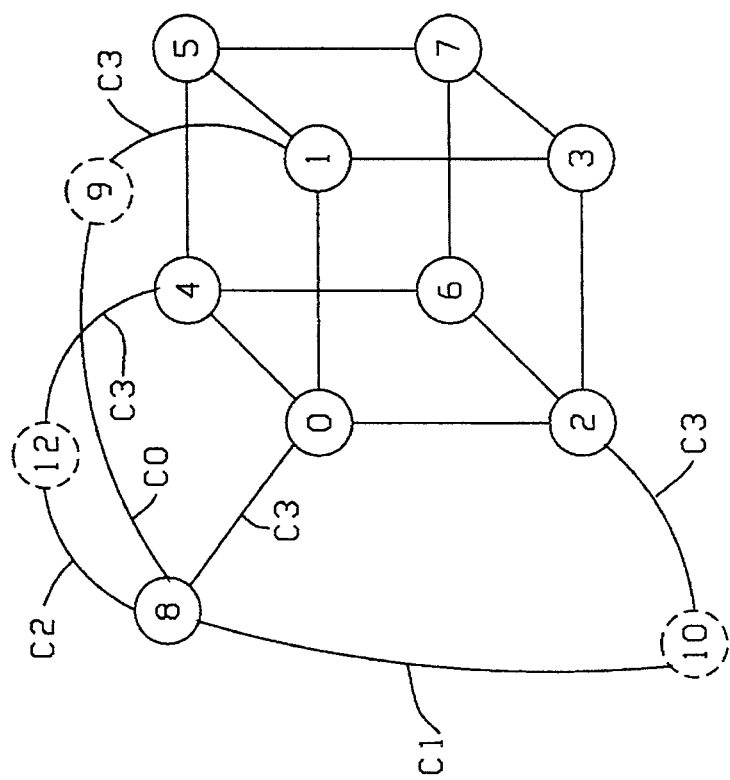
FIG. 4 shows a nine node data processing system which is structured in accordance with the present invention.
Figure 7:
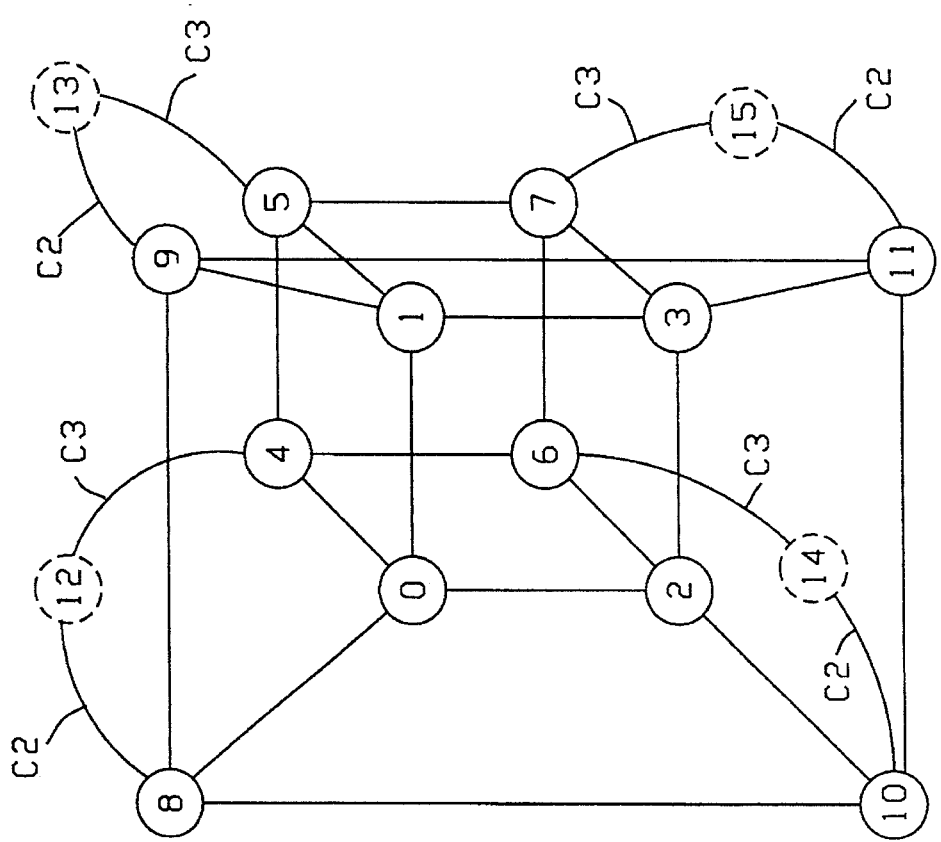
FIG. 7 shows a twelve node data processing system which is structured in accordance with the present invention.
Figure 6:
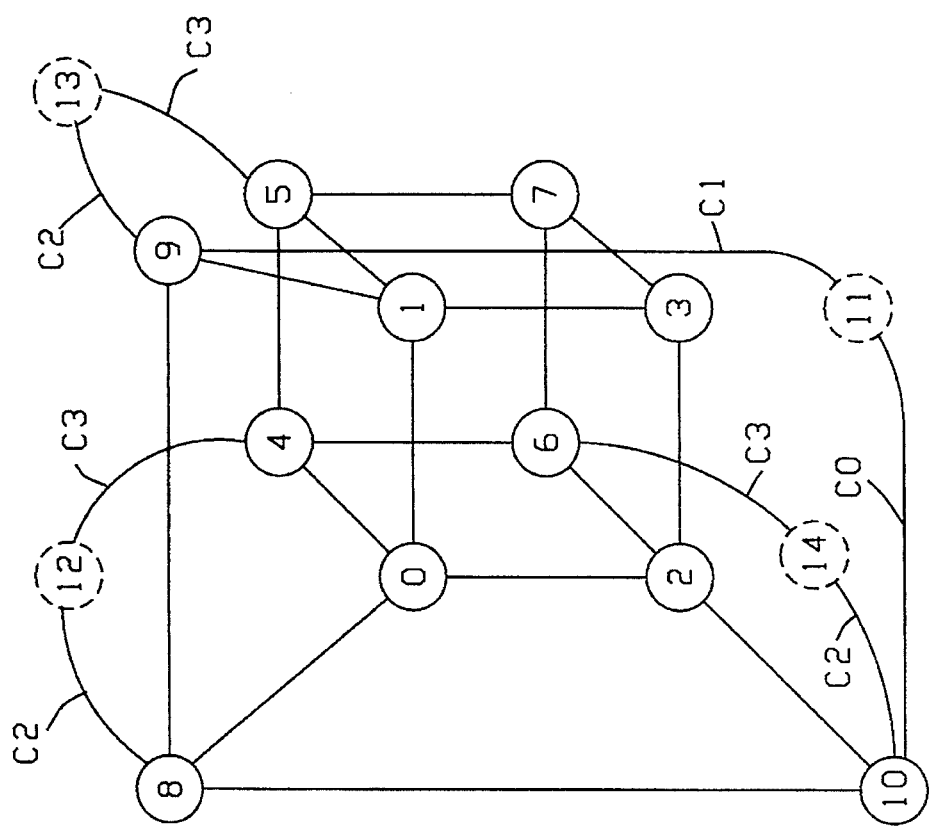
FIG. 6 shows a eleven node data processing system which is structured in accordance with the present invention.
Figure 9:
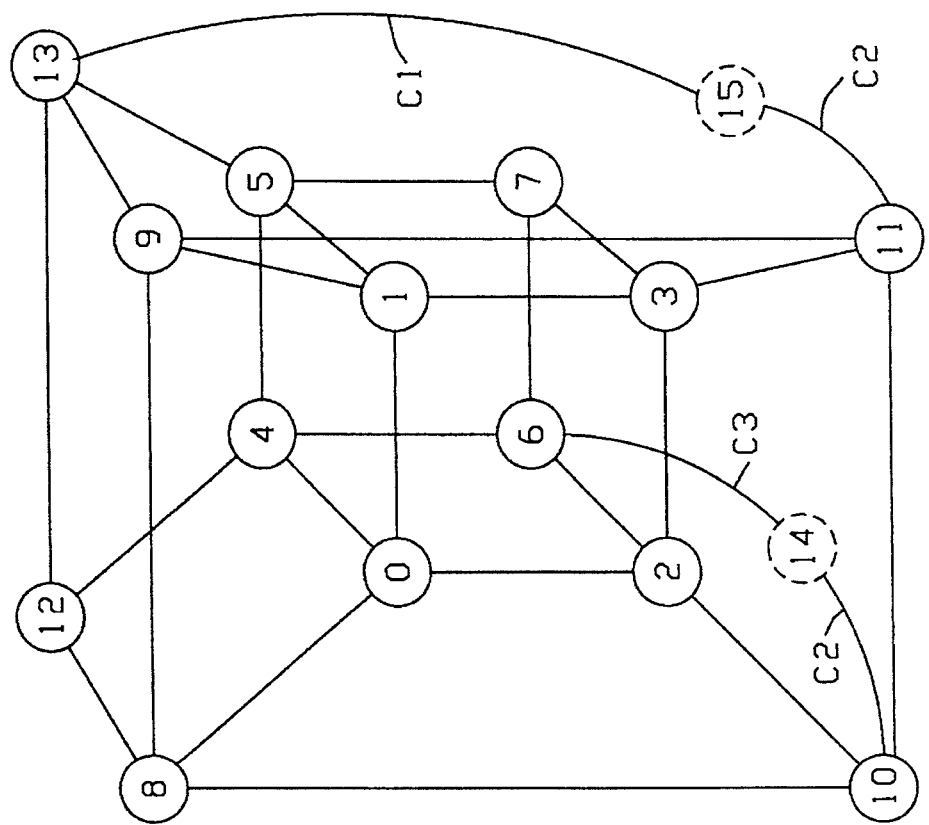
FIG. 9 shows a fourteen node data processing system which is structured in accordance with the present invention.
Figure 8:
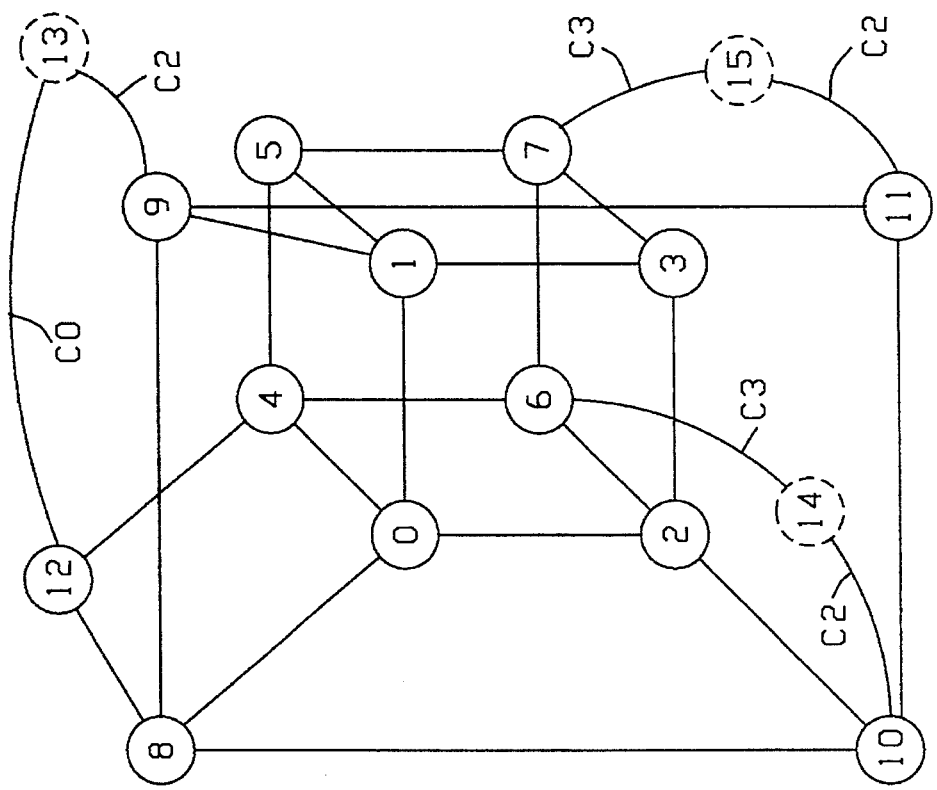
FIG. 8 shows a thirteen node data processing system which is structured in accordance with the present invention.

For example, in the FIG. 4 system, there are a total of nine nodes 0, 1, . . . 8; and the channel(x) to channel(y) connections occur between nodes 8 and 1; nodes 8 and 2, and nodes 8 and 4. For nodes 8 and 1, the binary addresses are 1000 and 0001 which differ by bits $b_0$ and $b_3$; and, thus those nodes are interconnected via a channel(0) to channel(3) connection. Similarly, for nodes 8 and 2 the binary addresses are 1000 and 0010 which differ by bits $b_1$ and $b_3$; and thus those nodes are interconnected via a channel(1) to channel(3) connection. Likewise for nodes 8 and 4, the binary addresses are 10000 and 0100 which differ by bits $b_2$ and $b_3$; and thus those nodes are interconnected via a channel(2) to channel(3) connection.

Note that in order to interconnect the nodes 8 and 1, 8 and 2, and 8 and 4 via channel(x) to channel(x) connections, three extra nodes would need to be added. These extra nodes are shown in FIG. 4 by circles that are drawn with dashed lines; and their addresses are 9, 10, and 12. However, as was previously the case in the FIG. 1 system, these extra nodes are themselves isolated since they are each connected to other nodes through only two input/output channels.

Note also in the FIG. 4 system that all of the connections between the nodes 0 thru 7 are channel(x) to channel(x) connections which are exactly the same as shown in the FIG. 1 system; and thus they are not relabeled in FIG. 4 in order to highlight just the channel(x) to channel(y) connections.

For example, the nodes 2 and 3 in FIG'S. 1 and 4 have binary addresses of 0010 and 0011 which differ by bit $b_0$; and thus nodes 2 and 3 are interconnected by a channel(0) to channel(0) connection.

Each data processing system of FIG. 5 thru FIG. 10 is similar in structure to the FIG. 4 system with the primary difference being that in each successive figure, one more node is added to the system. Table 2 below lists the number of nodes in the systems of FIG'S. 4 thru FIG. 10; and, table 2 also lists the nodes which are interconnected with channel(x) to channel(y) connections.

TABLE 2

| Figure | Total Number of Nodes | Nodes With Channel(x) to Channel(y) Connections |
| --- | --- | --- |
| 4 | 9 | 8-1 |
|   |   | 8-2 |
|   |   | 8-4 |
| 5 | 10 | 8-2 |
|   |   | 8-4 |
|   |   | 9-3 |
|   |   | 9-5 |
| 6 | 11 | 8-4 |
|   |   | 9-5 |
|   |   | 10-6 |
|   |   | 10-9 |
| 7 | 12 | 8-4 |
|   |   | 9-5 |
|   |   | 10-6 |
|   |   | 11-7 |
| 8 | 13 | 9-12 |
|   |   | 10-2 |
|   |   | 11-7 |
| 9 | 14 | 10-2 |
|   |   | 13-11 |
| 10 | 15 | 13-7 |
|   |   | 14-11 |

Figure 10:
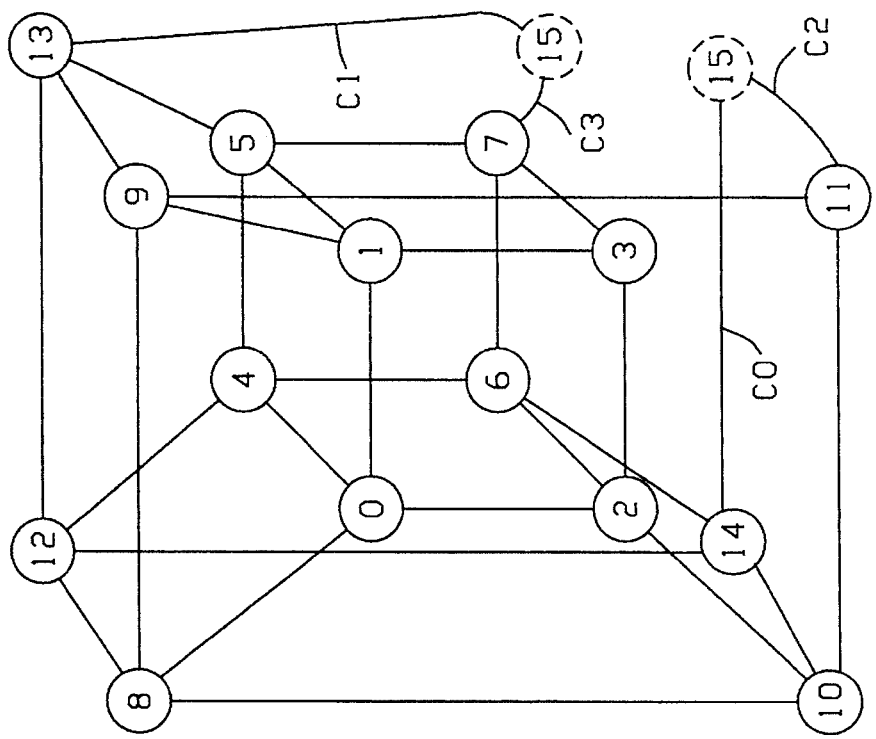
FIG. 10 shows a fifteen node data processing system which is structured in accordance with the present invention; and, FIG. 11 shows a seventeen node data processing system which is structured in accordance with the present invention.

From the middle column of Table 2 it is seen that FIG'S. 4 thru FIG. 10 illustrate data processing systems where the total number of nodes is more than $2^{n-1}$ but less than $2^n$ for n=4. When n is a larger integer, the data processing system will have similar channel(x) to channel(x) and channel(x) to channel(y) connections.

Figure 11:
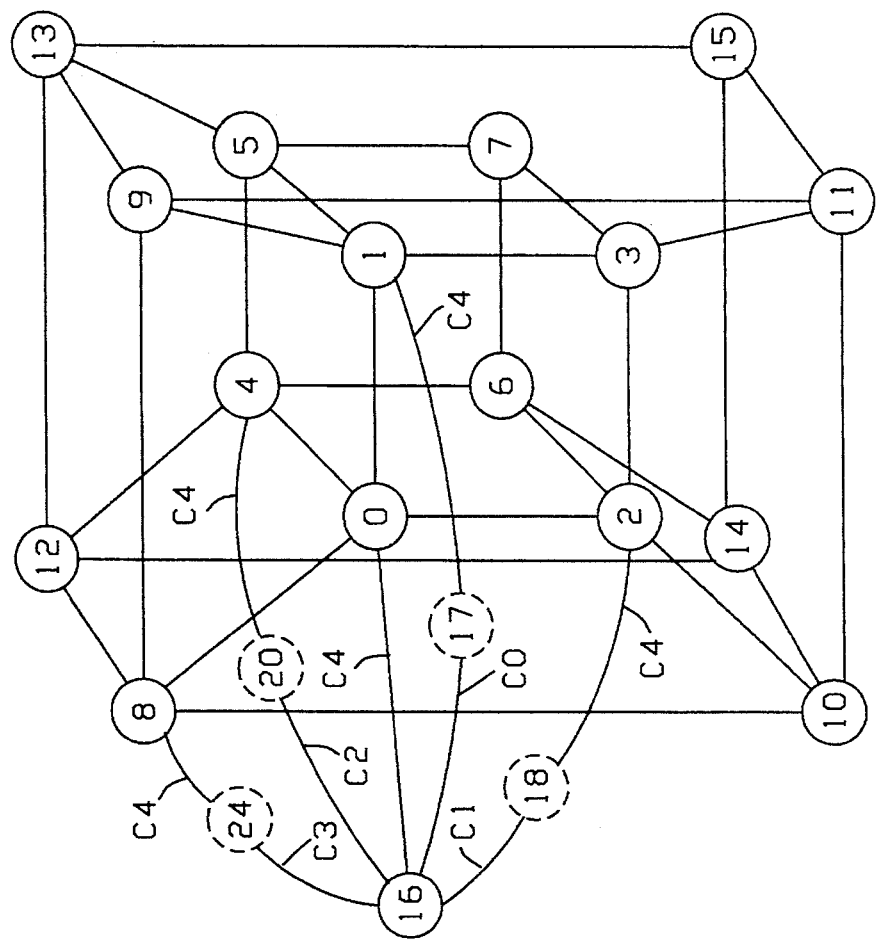

For example, FIG. 11 shows an n=5 system which has a total of seventeen nodes 0, 1, . . . 16. In FIG. 11, the channel(x) to channel(x) connections occur between all nodes whose binary address differ by only one bit (i.e.— nodes 0 thru 15); and channel(x) to channel(y) connections occur between nodes 16 and 1, 16 and 2, 16 and 4, and 16 and 8. Nodes 16 and 1 differ in their binary address by bits $b_0$ and $b_4$ so they are interconnected via a channel(0) to channel(4) connection; nodes 16 and 2 differ in their binary address by bits $b_1$ and $b_4$ so they are interconnected via a channel(1) to channel(4) connection; nodes 16 and 4 differ in their binary address by bits $b_2$ and $b_4$ so they are interconnected via a channel(2) to channel(4) connection; and nodes 16 and 8 differ in their binary address by bits $b_3$ and $b_4$ so they are interconnected via a channel(3) to channel(4) connection.

In each system of FIG'S. 4 thru 11, the sum of the channel(x) to channel(y) connections plus the channel(x) to channel(x) connections from any one node is within one of the sum of such connections from any other node. For example in the FIG. 11 system, the above sum from each node is four or five. Thus, in the system of FIG'S. 4 thru 11, there are no isolated nodes.

Also in each system of FIG'S. 4 thru 11, every node whose most significant address bit $b_{n-1}$ is a one has all of its channels 0, 1, . . . n–1 connected to a channel of another node; and, only nodes whose most significant address bit $b_{n-1}$ is a zero, have an unconnected channel. This constraint is preferred because it insures that the nodes are not isolated even when they lie at the outer perimeter of the system and are unable to make symmetrical connections with their neighbors.

Further in the above system, every node has all of its low numbered channels 0, 1, . . . n–2 connected to a channel of another node; only the highest numbered channel(n–1) is unconnected. This structural constraint also is preferred, though not required. For example, this constraint is not met by the FIG. 1 system since node 9 has channel(1) unconnected.

Also, as still another variation or modification to all of the above described systems, it is to be understood that within each node, many other additional circuits may be included to actually process data after it is received at the destination. For example, these additional circuits can include a data memory for storing the data, a microprocessor for operating on the data, and an instruction memory for holding a program which directs the operations that the microprocessor performs. Such data processing circuitry is outside the scope of the present invention.

Also, as still another variation, certain modifications may be made to the header routing circuit of FIG. 3. In particular, the subtract by two circuit 47 can be replaced with a subtract by three circuit if step 31a of the header routing process of FIG. 2 is changed to read "1 or 2 or 3" and step 32a is changed to read "more than 3". Likewise, circuit 47 of FIG. 3 can be replaced with a subtract by four circuit if step 31a of FIG. 2 is changed to read "1 or 2 or 3 or 4" and step 32a is changed to read "more than 4". To accommodate these variations, circuit 47 is preferably eliminated from FIG. 3; and in its place, the source node assumes the task of subtracting a selectable integer of two or more from the distance field and loading the result into register 42.

Accordingly, the present invention is not to be limited to just the illustrated embodiments but is defined by the appended claims.

What is claimed is:

1. A multiprocessor data processing system comprising:

a plurality of data processing nodes with the total number of nodes in said plurality being more than $2^{n-1}$ and less than $2^n$ where n is an integer larger than two;

each node having n input/output channels which respectively are channel(0), channel(1), . . . channel(n–1); and each node having a binary address $b_{n-1} \ldots b_1 b_0$ which runs consecutively from node to node;

all of said nodes being interconnected by said channels in an array which is unsymmetrical;

each pair of nodes in said unsymmetrical array whose binary addresses differ by only one binary bit $b_x$ being interconnected by a channel(x) to channel(x) connection, where x=0,1, . . . n–1; and, at least one pair of nodes in said unsymmetrical array whose binary addresses differ by two binary bits $b_x$ and $b_y$ being interconnected by a channel(x) to channel(y) connection with no intervening node therebetween, where x and y=0,1, . . . n–1.

2. A data processing system according to claim 1 wherein each node includes: an input register which receives, from a first one of its channels, a header with a destination field and a distance field; and a control circuit which selects a second one of its channels for sending a modified header thereon, with said second channel being selected from the set of channels which shorten the distance to said destination by one or two or maintain the same distance thereto.

3. A data processing system according to claim 1 wherein each node includes: an input register which receives, from a first one of its channels, a header with a destination field and a distance field; and a transmitter which sends a modified header on a second one of its channels; and wherein to generate said modified header, each node further includes a conditional subtracter circuit which—a) subtracts two from said distance field if the selected channel forms a channel(x) to channel(y) connection to another node, and b) otherwise subtracts one from said distance field.

4. A data processing system according to claim 1 wherein the sum of said channel(x) to channel(x) connections plus said channel(x) to channel(y) connections from any particular node is within one of the sum of such connections from any other node.

5. A data processing system according to claim 1 wherein at least one node has multiple channel(x) to channel(y) connections to other nodes.

6. A data processing system according to claim 1 wherein every node, whose most significant address bit $b_{n-1}$ is a one, has all of its channels connected to a channel of another node; and, only nodes whose most significant address bit $b_{n-1}$ is a zero, have an unconnected channel.

7. A data processing system according to claim 1 wherein every node has its channel(0), channel(1), . . . channel(n–2) connected to a channel of another node; and, the only unconnected channel from any node is channel(n–1).

8. A data processing system according to claim 2 wherein to generate said modified header, each node further includes a conditional subtracter circuit which—a) subtracts two from said distance field if the selected channel forms a channel(x) to channel(y) connection to another node, and b) otherwise subtracts one from said distance field.

9. A data processing system according to claim 8 wherein said control circuit includes a) a mask register which identifies any of the nodes's channels that are unconnected, and b) a logic circuit coupled to said mask register which prevents the unconnected channels from being tried.

10. A data processing system according to claim 9 wherein the sum of said channel(x) to channel(x) connections plus channel(x) to channel(y) connections from any particular node is within one of the sum of such connections from any other node.

11. A data processing system according to claim 10 wherein at least one node has multiple channel(x) to channel(y) connections to other nodes.

12. A data processing system according to claim 11 wherein every node, whose most significant address bit $b_{n-1}$ is a one, has all of its channels connected to a channel of another node; and, only nodes whose most significant address bit $b_{n-1}$ is a zero, have an unconnected channel.

13. A data processing system according to claim 12 wherein every node has its channel(0), channel(1), . . . channel(n–2) connected to a channel of another node; and, the only unconnected channel from any node is channel(n–1).

* * * * *